Patented Aug. 16, 1949

2,479,067

UNITED STATES PATENT OFFICE 2,479,067

PREPARATION OF TEREPHTHALIC ACID

William F. Gresham, Wilmington, Del., assignor to E. I. du Pont de Nemours & Company, Wilmington, Del., a corporation of Delaware No Drawing. Application June 5, 1947, Serial No. 752,844

5 Claims. (Cl. 260—524)

This invention relates to the manufacture of terephthalic acid and more particularly to a novel process for the manufacture of terephthalic acid by the liquid-phase air oxidation of p-toluic acid.

Heretofore, terephthalic acid has been obtained by various methods such as by the oxidation of p-dialkyl benzenes or p-alkyl benzoic acids. For example, it has been known for many years that terephthalic acid can be prepared by oxidation of p-xylene with nitric acid. However, the oxidation of p-xylene with nitric acid, according to the previously known process, was not commercially satisfactory since it gave rise to a mixture of products including p-toluic acid, nitrotoluic acid, etc. The Loder patent, U. S. 2,245,528, describes a process for the liquid-phase air oxidation of alkyl-substituted aromatic compounds such as the alkyl benzenes and carboxyl-substituted alkyl benzenes. In the said process the alkyl-substituted aromatic compound is oxidized in the presence of a solvent such as acetic acid, at elevated temperatures and pressures, and specific catalysts, such as vanadium, cerium, cobalt, manganese, etc. salts are disclosed as being effective. Moreover, the Loder patent states that oxidation "initiators," such as organic peroxides, aldehydes, ketones, etc. have a beneficial effect upon the oxidation reaction. In the said process, however, alkyl substituted aromatic compounds other than toluene gave, in general, a rather complex mixture of oxidation products. For example, the oxidation of mixed xylenes in an acetic acid medium containing diethyl ketone as an oxidation initiator, and a mixed cobalt acetate-manganese acetate catalyst, gave about 50.3% yield of toluic acid, 2.0% yield of phthalic acids, 1.5% yield of toluyl alcohols, 8.% yield of toluyl esters and 5.7% yield of toluic aldehydes. The process, as described in the Loder patent, therefore, appeared to be quite unsatisfactory for the manufacture of terephthalic acid on a large scale.

An object of this invention is to provide a novel process whereby terephthalic acid can be obtained from relatively cheap starting materials in high yield. Another object of the invention is to provide improvements in the process for oxidizing p-toluic acid to terephthalic acid so that the oxidation is directed almost exclusively to the formation of the desired product rather than to the formation of miscellaneous partial oxidation products. A further object is to provide a catalytic process for oxidizing p-toluic acid to terephthalic acid without simultaneous oxidation of the organic diluent which is employed in the said process. Other objects of the invention will appear hereinafter.

It has been discovered in accordance with this invention that terephthalic acid can be produced in high yield by passing air through a liquid phase reaction mixture containing p-toluic acid and a lead acetate catalyst in an acetic acid medium at a temperature within the range of about 150° to 275° C. under superatmospheric pressure. If desired, about 0.1 to 10.0% by weight of an organic oxidation initiator (e. g. one or more substances of the class consisting of lower aliphatic aldehydes and lower aliphatic ketones), based on the weight of p-toluic acid, may be present. Best results are obtained in accordance with the invention at a temperature within the range of about 180° to 220° C., and at a pressure sufficiently high to keep the acetic acid in the liquid phase. Pressures of about 700 to 1000 lbs. per square inch are frequently suitable, but it is to be understood that any convenient pressure, e. g. a pressure of about 2 to 1000 atmospheres, may be employed. In general, it is desirable to control the rate of injection of air so that an adequate concentration of oxygen is present in the reaction vessel; this can be done by introducing the air, and releasing the exit gas, at such a rate that the exit gas contains about 12.0 to 17.0% oxygen by volume.

The oxidation initiators which, in specific embodiments, may be employed in the practice of the invention, are substances which are capable of starting the oxidation reaction, i. e. they are substances such as the aldehydes or ketones which react rather readily with atmospheric oxygen to form peroxides, or which supply oxygen in such an active form that they initiate oxidation reactions. For example, the organic oxidation initiators include organic peroxides, such as benzoyl peroxides; per acids, such as per acetic and per benzoic acids; the aldehydes, such as acetaldehyde, propionaldehyde, and isobutyraldehyde; ketones, such as acetone, methylethyl ketone, diethyl ketone and cyclohexanone; ethers, such as diisopropyl, diethyl and diamyl ethers; olefins, such as cyclohexene and octylene, and, in fact, any organic compound which tends to form peroxide bodies under the reaction conditions.

In batchwise operation, the initiator is generally introduced into the reaction mixture along with the other reacting substances, but, as an alternative, it may also be introduced as the oxidation progresses. The oxidation may also be conducted by passing the reaction mixture continuously through a reaction vessel while introducing air at the desired temperature and pressure, and in the latter embodiment the oxidation initiator is invariably present as a result of partial oxidation of the toluic acid which has already been introduced.

The present invention is based in part upon the surprising discovery that lead acetate is a highly specific and unusually efficient catalyst in the air oxidation of p-toluic acid to terephthalic acid. It was indeed surprising to observe that, in the practice of this invention, only very small quantities of partial oxidation products such as alcohols, aldehydes, esters, etc., even when a low percentage of p-toluic acid charged is oxidized, are produced. An important advantage of the lead acetate catalyst is that it permits oxidation of p-toluic acid to terephthalic acid at temperatures above 150° C. in an acetic acid diluent, without any substantial oxidation of the acetic acid diluent. This is a highly significant advance in the art, because, in the presence of other catalysts, acetic acid is oxidized to carbon dioxide at a relatively rapid rate at temperatures above 150° C., and especially at temperatures in excess of 180° C., when sufficient pressure is employed to keep the acetic acid in the liquid phase.

The invention is illustrated further by means of the following example.

*Example.*—A mixture containing 500 grams of glacial acetic acid, 68 grams p-toluic acid, 0.5 gram lead acetate, 0.5 gram propionaldehyde, and 0.5 gram of ethylmethyl ketone, was placed in a pressure-resistant vessel and heated to a temperature of 180° C. Air was then injected into the mixture through an opening at the bottom of the vessel. The pressure on the mixture was maintained within the range of 750 to 900 lbs. per square inch by controlling the rate at which the exit gas was released from the reaction vessel. The injection of air was continued for a period of 3.5 hours, during which time the oxygen content of the exit gas varied from 12.4% to 15.8%. The reaction mixture was then withdrawn from the oxidizer, and filtered at a temperature of about 70° C. The reaction vessel was washed with dilute caustic and the wash liquor was acidified, yielding a precipitate of terephthalic acid. The combined weight of terephthalic acid obtained from the caustic washes and by filtration of the acetic acid solution was 17.7 grams. The weight of p-toluic acid recovered by evaporation of acetic acid from the remainder of the reaction mixture was 52.8 grams. This corresponds to a conversion of p-toluic acid to terephthalic acid of about 21.3%, and a yield of terephthalic acid, based upon the weight of p-toluic acid consumed, of 91.6%. During this experiment the maximum content of $CO_2$ in the exit gas was 3.6% by volume, and throughout 2.75 hours of operation the $CO_2$ content was within the range of 1.4 to 2.4%. The recovered p-toluic acid was found to be fairly pure (acid No.=414, 415; theory=412) and the terephthalic acid was found to be only slightly contaminated with a less highly acidic substance, probably p-toluic acid. The crude terephthalic acid could be purified quite readily by extraction with acetone. In a similar experiment, in which a cobalt acetate catalyst was employed instead of the lead acetate catalyst, the $CO_2$ content of the exit gas reached 6.2% (temperature, 181° C.), and remained at 4.2% to 6.2% for one hour while the temperature was 167° to 181° C. (typical analysis of the exit during this period: 5.8% $CO_2$, 13.6% $O_2$, 1.2% CO, 79.4% $N_2$). Despite the high loss to $CO_2$ in the latter experiment the yield of terephthalic acid was high (exceeding 90%), which indicated that the $CO_2$ must have been formed by oxidation of the acetic acid diluent.

The above example is illustrative only and is not intended to limit the invention in any way. Numerous modifications of the invention will occur to those who are skilled in the art. Diluents other than acetic acid may be used but, in general, they oxidize too rapidly, and they therefore are not as satisfactory as acetic acid. In the continuous process, the reactants may be passed through the oxidizer either cocurrently or countercurrently. The reaction vessel may be in the form of a stirred autoclave or in any other suitable form, such as tower or a horizontal tubular reaction unit. Several such vessels in series may be used if desired. Any suitable method may be employed for obtaining adequate contact between the oxidizing gas and the liquid reaction medium. The percentage conversion of p-toluic acid to terephthalic acid may be varied over a very wide range, i. e. it may be as low as about 5% or less, or it may be so high that it closely approaches the maximum amount theoretically obtainable. Since numerous methods for practicing the invention will occur to those skilled in the art, it will be understood that I do not limit myself except as set forth in the following claims.

I claim:

1. A process for the production of terephthalic acid which comprises passing air through a liquid-phase reaction mixture containing p-toluic acid and a lead acetate catalyst in an acetic acid medium at a temperature within the range of 150° to 275° C. under superatmospheric pressure, whereby oxidation of the p-toluic acid to terephthalic acid takes place, and thereafter separating terephthalic acid from the resulting mixture.

2. A process for the production of terephthalic acid which comprises passing air through a liquid-phase reaction mixture containing p-toluic acid, a lead acetate catalyst, and about 0.1 to 10.0% by weight of an organic oxidation initiator, based on the weight of p-toluic acid introduced, in an acetic acid medium at a temperature within the range of 150° to 275° C. under superatmospheric pressure, whereby oxidation of the p-toluic acid to terephthalic acid takes place, and thereafter separating terephthalic acid from the resulting mixture.

3. A process for the production of terephthalic acid which comprises passing air through a liquid-phase reaction mixture containing p-toluic acid, a lead acetate catalyst, and about 0.1 to 10.0% by weight of an organic oxidation initiator based on the weight of p-toluic acid introduced, in an acetic acid medium at a temperature within the range of 150° to 275° C. under superatmospheric pressure, controlling the rate of injection of air and the rate of withdrawal of exit gas so that the exit gas contains about 12.0 to 17.0% of oxygen by volume, whereby terephthalic acid is produced, and thereafter separating terephthalic acid from the resulting mixture.

4. A process for the production of terephthalic acid which comprises passing air through a liquid-phase reaction mixture containing p-toluic acid, a lead acetate catalyst, and about 0.1 to 10.0% by weight of an organic oxidation initiator based on the weight of p-toluic acid introduced, in an acetic acid medium at a temperature within the range of 180° to 220° C. under a pressure within the range of 700 to 1000 lbs. per square inch, whereby oxidation of the p-toluic acid to terephthalic acid takes place, and thereafter separating terephthalic acid from the resulting mixture.

5. In a process for the production of terephthalic acid the steps which consist in heating a dilute solution of p-toluic acid in glacial acetic acid in the presence of a lead acetate catalyst, said solution containing about 0.1 to 10.0% by weight of an organic oxidation initiator comprising at least one member of the class consisting of lower aliphatic aldehydes and lower aliphatic ketones, to a temperature of about 180° to 220° C., injecting air into the mixture while maintaining the pressure of the reaction mixture sufficiently high to keep the acetic acid substantially in the liquid phase, releasing exit gas from the reaction vessel while the oxidation progresses, continuing the oxidation until a substantial part of the p-toluic acid has been converted to terephthalic acid without the formation of less highly oxidized products, thereafter removing the resulting mixture from the reaction vessel, and separating terephthalic acid from the said mixture.

WILLIAM F. GRESHAM.

REFERENCES CITED

The following references are of record in the file of this patent:

UNITED STATES PATENTS

| Number | Name | Date |
| --- | --- | --- |
| 2,245,528 | Loder | June 10, 1941 |
| 2,276,774 | Henke | Mar. 17, 1942 |
| 2,302,463 | Palmer et al. | Nov. 17, 1942 |
| 2,425,881 | Hull | Aug. 19, 1947 |